INVENTOR
WALTER W. GUIDICE

BY Warrel M. Crews
ATTORNEY.

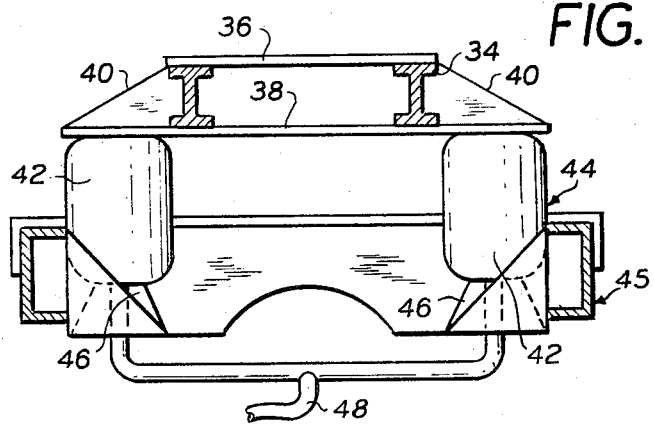
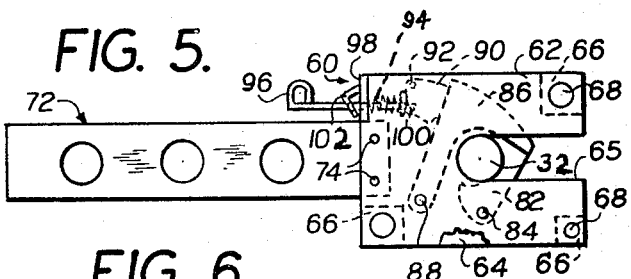
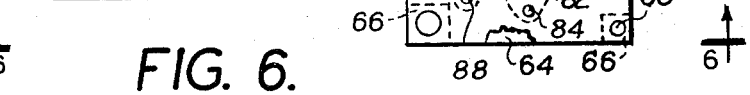
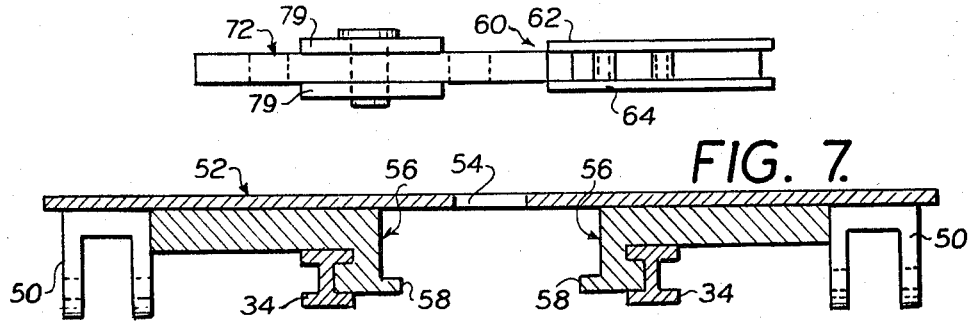
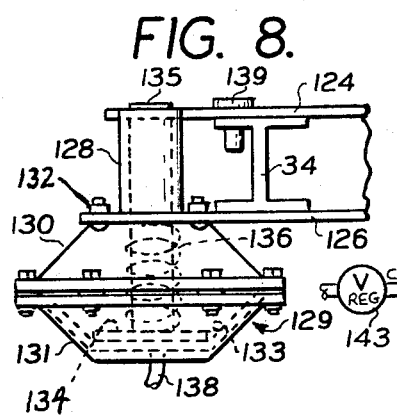
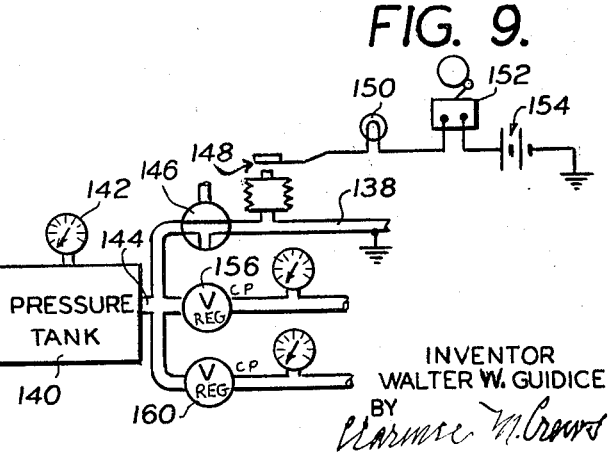

3,439,935
FIFTH WHEEL TRACTOR
Walter W. Guidice, Rogue River, Oreg.
(11721 8th Ave. NE., Seattle, Wash. 98125)
Filed Mar. 20, 1967, Ser. No. 630,780
Int. Cl. B62d 53/08, 53/10
U.S. Cl. 280—407                                10 Claims

ABSTRACT OF THE DISCLOSURE

A trailer bearing tractor is modified to provide cushioning support of the fifth wheel from the tractor frame far enough removed from the transverse rocking axis of the fifth wheel significantly to affect the distribution or allocation of load between the front and rear tractor wheels.

A longitudinally adjustable fifth wheel section serves to locate the trailer kingpin over, before or behind the transverse rocking axis of the fifth wheel, thereby to affect significantly the allocation of load between the rear tractor wheels and the trailer wheels.

An anti-jackknife device is made available on demand.

Both primary and supplemental locks are provided for safeguarding the fifth wheel-kingpin connection.

---

This invention relates to tractors and trailers designed to be coupled to one another through a so-called fifth wheel on the tractor and a kingpin on the trailer, in combination with suitable kingpin locking means carried by the fifth wheel.

Vehicular combinations of the kind referred to are regarded as highly efficient and advantageous and are widely used. Among the many advantages found in using them may be noted the following: (1) they combine great load carrying capacity with a high degree of maneuverability, being able to negotiate sharp curves on narrow city streets which would be out of the question for trucks of rigid construction and equal load carrying capacity, and (2) they provide complete inter-changeability of tractor and trailer units. By virtue of the latter feature, the detention of a trailer at a loading or unloading station does not necessarily detain a tractor with it. Neither is a trailer, with its cargo, held up in transit longer than the time required to provide a substitute tractor when the original tractor is disabled.

Tractor-trailer combinations, as presently constructed, are, however, subject to serious drawbacks and limitations.

There are legal load limitations for the several axles or wheel combinations of the tractor and the trailer, and these limitations are directly related to the load carrying capacity of the pneumatic tires. Care must be taken, therefore, in the loading of the trailer, to see that the load is distributed to the best advantage. Overloading of an axle presents a grave peril to the driver or drivers of the tractor-trailer combination, because of the possibility of mechanical failure and the probability of blowing out of mechanical failure and the probability of blowing out tires while traveling at high speed. This is also hazardous to others. If the overloading of a tractor or trailer axle is detected by the authorities, the driver is penalized and is required to redistribute and/or lighten the load.

As a general rule, half the weight of the trailer and its cargo, or more than half the weight, is borne by the rear wheels of the tractor, and the remaining weight of the trailer is borne by the wheels at the rear of the trailer. On some trailers the kingpin is located in fixed position near the forward end of the trailer; on others the kingpin is located in a fixed position a considerable distance back from the forward end of the trailer; while on still others the kingpin is located in any one of various intermediate fixed positions between the extremes. The farther back the kingpin is located on the trailer the greater will be the overhang of the trailer relative to the tractor, and the greater will be the proportion of the trailer weight carried by the tractor. There is no way, however, to vary the division of trailer load between the trailer wheels and the tractor rear wheels for a particular trailer. If there is an illegal overload, the cargo on the trailer must be rearranged or lightened.

From another point of view, the entire trailer load applied to the tractor is applied in a fixed position at the fifth wheel socket in which the kingpin is locked. There is never any economical and efficient structure through which a portion of the load on the rear wheels of the tractor can be transferred to the front wheels of the tractor, and there is generally no way at all in which such a transfer can be effected. Again, the only way in which an illegal load on the rear wheels of the tractor can be corrected is by readjusting or lightening the cargo.

Conventional tractor-trailer combinations subject the driver or drivers to a very punishing ride. The tractor and the trailer respond to road shocks substantially independently of one another. Under varying road conditions the actions of the tractor and the trailer are frequently out of step, being inconsistent with one another, and the greater weight of the trailer tends to disturb the operator's control of the tractor and to do violence to the tractor. This is particularly true if the front or steering wheels of the tractor are too lightly loaded as compared with the rear wheels of the tractor.

It is common practice for two drivers to share the responsibility of a tractor-trailer for days on end, driving and sleeping in alternation on the tractor day and night, while traveling almost continuously. Not only is the driver buffeted about, but the sleeper is afforded very little rest or relaxation, and the sleeper frequently wakes to take his turn at the wheel in a condition bordering on physical and nervous exhaustion. These conditions add greatly to the hazards of the road. They also contribute importantly to the enforced early retirement of many of the drivers because of permanently impaired health.

The most serious hazard of all for the drivers is, perhaps, jackknifing of the trailer. This can occur whenever a curve is taken at too high speed, but the experienced driver will generally avoid that. Jackknifing more frequently occurs at low speeds and on relatively straight roads under icy conditions or under other conditions of poor traction, especially on steep down-grades. Jackknifing is very likely to prove fatal to the driver or drivers, is destructive of the vehicle components and the cargo, and may involve pedestrians, other drivers, and the vehicles of others.

It is an important aim of the present invention to obviate, or at the very least to mitigate to a marked degree, each and every one of the foregoing shortcomings.

With the above considerations in view, it is an object of the invention to provide a forward extension of the fifth wheel in combination with a cushion device supported from the tractor frame at a substantial distance in front of the transverse horizontal axis of the fifth wheel, bearing upward against the fifth wheel extension. The cushion device is desirably a pneumatic device. It can be regulated from the cab of the tractor, to cause a greater or lesser portion of the trailer load to be shifted forward, thereby to increase the share of the load borne by the front axle of the tractor, and to diminish the share of the load borne by the rear axles of the tractor.

It is a further important object to provide for a redivision of the trailer load between the trailer wheels and the rear wheels of the tractor. For this purpose the fifth wheel is provided with a distinct section for carrying the kingpin socket and the kingpin locking mechanism, which may be adjusted, within limits, to the front and rear of the transverse axis of the fifth wheel as desired. As the kingpin socket is shifted forward, an increased share of the trailer load is carried by the tractor, and the load on the wheels of the trailer is correspondingly lightened.

It is a still further important object to provide a cushion, controllable from the cab, between the fifth wheel and the tractor body to the rear of the transverse axis of the fifth wheel. This tends to counteract the load shifting effect of the forward, load shifting cushion, but the front and rear cushions can be separately, pneumatically controlled to provide any desired degree of unbalance, and between them the two cushions can be adjusted to smooth out the ride and to cause the tractor and the trailer to operate more nearly in harmony with one another. It is not possible to establish a rule which can be followed for initial distribution of the load to secure the smoothest possible ride, but the operator can, from the cab, and with the vehicle in motion, adjust the relative and absolute pressures in the front and rear cushions to provide the riding conditions most comfortable to him for a particular road, and can effect readjustment from time to time as road conditions change. Generally the most comfortable driving conditions will be found to occur under conditions of good load distribution between the several sets of wheels of the tractor-trailer combination.

It is still another very important object to provide an anti-jackknife device which can be controlled from the cab to render it active and inactive, as desired. This device is intended for use primarily in coming down icy mountain roads and under other recognizably threatening conditions. It limits relative turning of the trailer and tractor to an abnormally narrow angle and must be normally maintained in a non-operating condition. Careful safeguards are provided against the inadvertent leaving on of the device after the apparent need for it has passed.

It is a feature of the invention that the structures for achieving the above objects are all provided in connection with the fifth wheel of the tractor, without conflict, and in harmonious, cooperative relation with one another.

Other objects and advantages will hereinafter appear.

In the drawing forming part of this specification:

FIGURE 4 is a view in front sectional elevation of the structure at the front end of the novel fifth wheel, the section being taken on the line 4—4 of FIGURE 3, looking in the direction of the arrows;

FIGURE 5 is a detailed plan view of an adjustable kingpin socket and locking unit;

FIGURE 6 is a view in side elevation of the unit of FIGURE 5 as indicated by the line 6—6 of FIGURE 5;

FIGURE 7 is a transverse sectional view taken on the line 7—7 of FIGURE 2, looking in the direction of the arrows, but showing only details of the fifth wheel whereby a slideway is provided for the kingpin socket and kingpin locking mechanism;

FIGURE 8 is a fragmentary view in rear elevation showing one of the two anti-jackknife pins and the mounting and operating structure associated therewith; and FIGURE 9 is a diagrammatic view showing how the air pressure is controlled in the load shifting and cushioning bags, and in the operating bags for the anti-jackknife pins.

Figure 1:
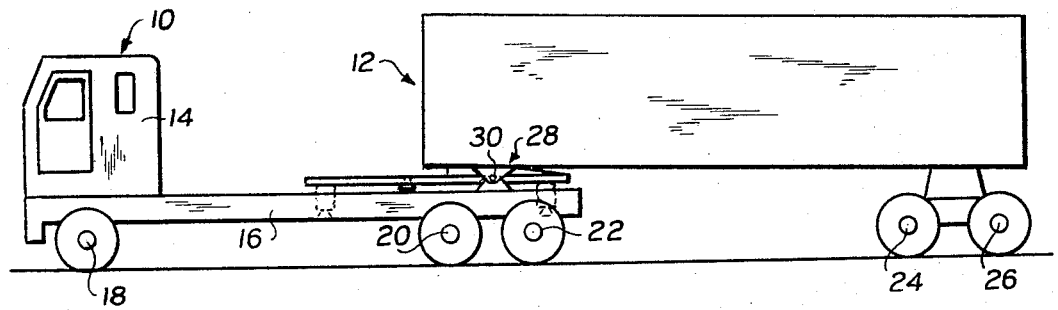
FIGURE 1 is a view in side elevation on a small scale showing a tractor-trailer combination, the tractor component of which embodies practical and advantageous features of the invention.

In FIGURE 1 a complete tractor-trailer combination is shown, comprising a tractor 10 and a trailer 12. The illustrative tractor 10 includes a cab 14, a body 16, a front axle 18, and two rear axles 20 and 22. The trailer 14 has no front wheels of its own but is supported upon the rear end of the tractor body. The trailer shown has two rear axles 24 and 26. Each of the axles 20, 22, 24 and 26 desirably has four wheels, two at either end of the axle.

The tractor is provided with a so-called fifth wheel 28 which is supported for rocking movement about a transverse axis on transverse bearing pins 30. The fifth wheel 28 is adapted to interfit with a kingpin 32 which projects downward from a point located near the forward end of the trailer. The kingpin is releasably locked to the fifth wheel with capacity for rotation about its own, vertical axis, relative to the fifth wheel. The kingpin is surrounded by a bearing plate (not shown) on the underside of the trailer. Substantially fifty percent or more of the entire weight of the trailer body and the trailer cargo is commonly transmitted from the bearing plate through the fifth wheel and the transverse bearing pins 30 to the rear end of the tractor frame, and thence through the axles 20 and 22, and the wheels thereon, to the ground. As thus far described, the tractor-trailer combination is purely conventional. The kingpin is located directly over the axial line of the transverse bearing pins 30, and the bearing pin axis is located midway between the axles 20 and 22. With the conventional arrangement there is no way to redistribute the load between the front axle 18 and the rear axles 20 and 22 of the tractor. If, in a tractor-trailer combination of the kind shown, the loads on the axles 20 and 22 exceed the legal limit, there is no way to correct the situation except by relocating the trailer cargo farther to the rear in the trailer. This may, however, result in the overloading of the axles 24 and 26. Only two courses are available in this kind of situation: (1) to proceed in defiance of the law, with consequent risk of serious accident through the blowing out of the overloaded tires, or (2) to unload a portion of the cargo.

Generally, the axle 18 will be found to be loaded far short of the legal limit, since it is generally required to support only the engine, the cab, and a portion of the tractor body. In consequence, the front wheels tend to be dominated by the trailer and by the heavy load carried by the rear end of the tractor. This makes for poor steering and for a rough ride. Road shocks originating in the heavily loaded areas, as in the trailer and in the trailer supporting portion of the tractor, act with objectionable violence upon the underloaded front wheels and upon the cab.

In accordance with a very important object of the invention, the fifth wheel of the tractor is modified so as to cause the redistribution of the weight between the front axle 18 and the rear axles 20 and 22 of the tractor, thereby to satisfy legal requirements, greatly to reduce the danger of blowouts, to improve the steering, and to improve the ride for the driver or drivers.

To this end, the fifth wheel is desirably provided with a forward extension by rigidly securing to its underside a pair of parallel I-beams or rails 34 which, as shown in the illustrative embodiment, extend forward for a substantial distance (substantially greater than the width of the fifth wheel) beyond the axis of the bearing pins 30. At their forward ends the I-beams 34 are connected, as by welding, to upper and lower horizontal connecting crossbeams 36 and 38, and to reinforcing webs or gussets 40. The lower crossbeam 38 extends laterally of the tractor wall beyond the I-beams 34. Strong, collapsible bags 42 of elastic material, such as rubber, are mounted in wells 44 formed in the truck frame 45, bearing at their lower ends upon frusto-conical pedestals 46 and at their upper ends against the lower, substantially horizontal, face of the crossbeam 38 in the end portions which protrude laterally beyond the I-beams. The bags form cushions as well as partial supports for the fifth wheel. The bags may be anchored at their lower ends to the pedestals 46 and at their upper ends to the crossbeams 38. The bags 42 are connected at their lower ends through airline 48 to a source of air under pressure in the cab, the arrangement being such that the operator can adjust the air pressure in the bags up or down as desired at any time. By applying pressure in the bags an upward thrust is imparted to the I-beams 34, tending to relieve the downward pressure transmitted through the transverse bearing pins 30.

The trailer continues to engage, and to bear heavily against, the upper face of the fifth wheel, but a portion of the load is transferred through the bags 42 to the tractor body 16 at a substantial distance in front of the rods 30, and hence causes transfer of some of the load from the axles 20 and 22 to the axle 18. The transferred portion of the load may be quite substantial, if desired. The amount of load so transferred will vary with the pressure maintained in the bags and will be proportional to the maximum horizontal cross-sectional area of the bags. As the pressure in the bags is diminished the bags fold at their lower margins and extend farther down around the pedestals 46. Equal pressures are always maintained in both the bags.

There is also a possibility that the weight of the trailer cargo will be unevenly distributed, with an excess of load at the forward end of the trailer or at the rear end of the trailer. This may or may not result in an illegal overload at the more heavily loaded end. In any event, however, it it desirable to be able to even out the load by shifting the center of gravity of the load forward or backward relative to the bearing pins 30 of the tractor without having to shift the cargo in the trailer. Modification of the fifth wheel to provide for such redistribution of the load is best illustrated in FIGURES 2, 3, 5, 6 and 7.

The fifth wheel 28 comprises the usual pivot ears 50 which have rigidly affixed to them a top bearing plate 52, which plate has a kingpin receiving slot 54 formed in it. The slot is of uniform width throughout most of its length, but is provided at its rear end with a flaring mouth. The bearing plate 52 in this instance is considerably thinner than is conventional, but the plate is strongly reinforced by blocks 56 which engage the lower face of the plate 52 and are rigidly united with it, as by welding. The blocks 56 are also affixed to the I-beams 34 and interfit with the I-beams. The blocks 56 have lower inwardly projecting flanges 58 which, together with the inner lateral faces of the blocks and the lower face of the plate 52, form a slideway (FIGURE 7), for a longitudinally adjustable fifth wheel section 60 (FIGURES 5 and 6).

The fifth wheel section 60 comprises upper and lower plates 62 and 64 which are spaced apart in parallel relation by spacer blocks 66, and are joined firmly to one another by rivets 68 which pass through the spacer blocks. The plates 62 and 64 are formed with slots 65 in their rear ends which coincide with selected segments of the narrow portion of the slot 54 of the top plate 52, for the accommodation of the trailer carried kingpin 32. Between the plates 62 and 64, the section 60 includes kingpin locking mechanism which will be described presently.

A tongue 72 has its rear end fitted snugly between the plates 62 and 64 and secured to them by rivets 74, which rivets pass through the plates and through the intervening tongue. The tongue is provided with three equally spaced pin receiving openings 76, through which the adjustable section 60 may be securely anchored in any one of three definite positions lengthwise of the tractor body. The tongue 72 protrudes forwardly beyond the forward boundary of the top plate 52, and is passed through an anchoring frame 78. The frame 78 consists of spaced upper and lower perforated plates 79 which are marginally secured to one another and affixed to the I-beams 34.

Figure 3:
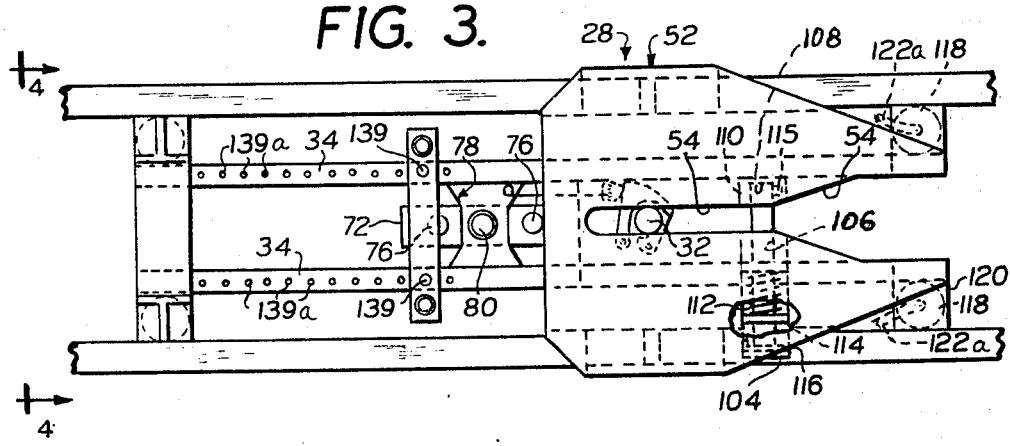
FIGURE 3 is a plan view of the structure shown in FIGURE 2.

As shown in FIGURE 3, a headed pin 80, having a shank diameter equal to that of the kingpin 32, is passed downward through the upper and lower openings of the anchoring frame 78 and through the central opening 76 of the interposed tongue 72. When the tractor is uncoupled from the trailer, the pin 80 may be withdrawn and the section 60 may be slid forward or backward to align the rear or front opening 76 of the tongue with the aligned pairs of openings in the anchoring frame. The pin 80 may then be reinserted and secured in place.

For locking the kingpin 32 to the adjustable section 60 of the fifth wheel and in contact with the forward end of the slots 65, a retaining latch 82 is mounted between the plates 62 and 64 on a pivot pin 84. A keeper latch 86, adapted in the locked position to overlie the latch 82, as shown in FIGURE 5, is mounted between the plates 62 and 64 on a pivot pin 88. A positively acting locking pawl 90, shown in FIGURE 5 in locking position, is mounted between the plates 62 and 64 upon a pivot pin 92. The pawl is normally rocked counterclockwise (as viewed in FIGURE 5) by a lightly compressed coil spring 94. A pull rod 96 is pivotally connected to the pawl 90 as shown, for rocking the pawl to a position in which it is completely clear of the range of movement of the latch 86. The rod 96 passes through an abutment plate 98, thence through the spring 94, and is pivotally connected at its rear end to the pawl 90. An abutment washer 100 surrounds the rod 96 between the pawl 90 and the spring 94, the washer serving to transmit the thrust of the spring to the pawl. A cramping detent ring 102 surrounds the rod 96 and bears against the forward face of the plate 98. The ring 102 will move forward with the rod 96 when the rod is pulled forward, but the ring can be slid rearward along the rod into engagement with the plate 98 for retaining the rod in its forward position. The particular locking mechanism shown and described can be replaced by any conventional locking mechanism which is capable of being contained in, or adapted to, the limited space available.

There is no reason to suppose that the locking mechainsm shown and described herein will prove any less reliable than any of the many different locking mechanisms presently employed. Although the conventional locking mechanisms are generally rugged and dependable all of them do fail at times. It is desirable, therefore, to provide an additional safeguard against the tractor's letting go of the trailer. A supplemental or safety locking device of this kind is shown in FIGURE 3.

A headed plunger pin 104 is passed through a bore 106 formed in one of the blocks 56, thence across the slot 54 and into a bore or well 108 which is formed in a fixed block 110. The bore 106 slidingly fits the plunger pin 104 at its inner end, but is enlarged to accommodate a compressed coil spring 112 which surrounds the rod. The bore 106 is closed at its outer end by a screw plate 114 which confines the spring. Suitable means may be provided for retaining the plunger in its active position and in its retracted position. For retaining the plunger in the active position the plunger is provided at its inner end with a side projection 115 which may be inserted into, and caught within, a bayonet slot (not shown) formed in the block 110. For retaining the plunger in retracted position a cramping ring 116 may be provided on the plunger adjacent the head thereof.

The cushion mechanism provided at the forward ends of the I-beams 34 is essentially duplicated at the rear ends of the I-beams. Strong collapsible bags 118 are mounted on truncated conical pedestals 119 in reinforced wells of the tractor frame as before, and these bags bear upward against, and are affixed to, the lower horizontal faces of abutment brackets 120, the brackets being rigidly affixed to the rear ends of the I-beams 34 The bags 118, so far as load distribution between axles is concerned, have an effect opposed to that produced by the bags 42. The bags 118 can be used to shift weight from the axle 18 of the tractor to the axles 20 and 22 of the tractor. This may be very desirable if the tractor is a truck-tractor, having a large cargo capacity of its own. More commonly, however, in a structure like that shown herein, there will be be a need to shift the load in the other direction so that the bags or cushions 42 would ordinarily be used alone, or preferably in such a way as to more than overbalance the load shifting tendency of the bags or cushions 118. This can easily be done, both because the bearing pins 30 will generally be farther from the bags 42 than from the bags 118, and because the driver, controlling the bags from the cab, can maintain different pressures in the two sets of bags for achieving whatever relation is most advantageous under the circumstances which may exist. The primary purpose of the bags 118 is to relieve the sharpness of road shocks transmitted by the trailer to the tractor, and when the bags 42 and 118 are used jointly and are adjusted with the car in motion, very advantageous results may be secured. Branch airlines 122a, together with a main airline 122, connect the source of compressed air with the bags 118.

Figure 2:
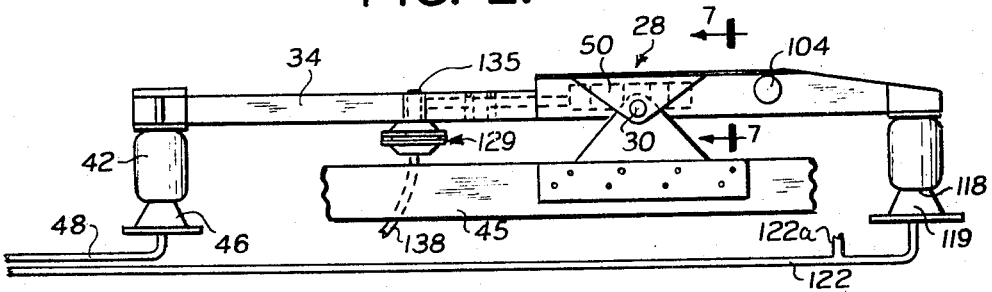
FIGURE 2 is a fragmentary view in side elevation of the rear end of the tractor body with all of the novel features of the invention applied thereto.

Mechanism for guarding against jackknifing is illustrated in FIGURES 2, 3 and 8. A framework is provided, composed of upper and lower cross-plates 124 and 126, which bear respectively against the upper and lower faces of the I-beams 34 and have their ends extended outward well beyond the lateral bounds of the I-beams. The protruding ends of the plates 124 and 126 are connected to one another by vertical sleeves 128 to complete the strong, rigid framework. A casing 129, composed of upper and lower flanged sections 130 and 131 is secured to the plate 126 by bolt and nut combinations 132. A strong rubber diaphragm 133, clamped between the flanges of casing sections 130 and 131, normally rests in the bottom of the casing.

The diaphragm 133 supports a plate 134, through which it is connected to a massive rod 135. A compressed coil spring 136 surrounds the rod and bears downward against the plate 134, normally to depress the rod to an inactive position like that shown in FIGURE 8. When air under pressure is introduced into the pressure chamber provided beneath the diaphragm, the rod 135 is projected upward far enough to stand in substantial obstructing relation to the forward end of the trailer body, to limit the extent of angular movement of the trailer body relative to the tractor in one direction. Since there are two of the rods 135, one at each side of the tractor, the angle through which the trailer can turn relative to the tractor is limited, the sharpness of the limitation depending upon how far in front of the forward end of the trailer body the rods 134 are located. Thus incipient jackknifing is aborted. When the air pressure is relieved, springs 136 assist in quickly depressing the rods to the ineffective condition of FIGURE 8. Compressed air is supplied to and exhausted from each casing 129 through an airline 138. The rods 135 may be located at various desired positions along the I-beams through the use of headed positioning pins 139 and a series of evenly spaced holes 139a formed in one or both of the upper flanges of each of the I-beams 34.

The airline supply and the controls therefor consist of elements which are well known per se and are, therefore, illustrated by conventional symbols. A pressure tank 140, equipped with a pressure gauge 142, is maintained by a pump, not shown, through a constant pressure regulator 143 at a fixed pressure, say of 120 p.s.i. A supply pipe 144 which leads from the tank 140 has three branches. One of these branches communicates through a simple on-off valve 146 with the airline 138 which runs to the two anti-jackknife bags 132. With the valve 146 in the position shown in FIGURE 9, the line 138 is in the active position and the full pressure is maintained in the bags 132. Since the full pressure of 120 p.s.i. is not required, a constant pressure reducing regulator (not shown) may be interposed ahead of the valve 146 if desired. When the valve 146 is turned 90° counterclockwise from the position shown in FIGURE 9 the line 138 is cut off from communication with the source of air under pressure, and is placed in communication with the atmosphere. Under the influence of the springs 136 the rods 135 are quickly depressed.

The line 138 has mounted on it a communicating Sylphon bellows for closing an electric switch 148 when the bellows is expanded by pressure, and for opening the switch when the pressure is relieved. The closing of the switch 148 completes a circuit for lighting a visual signal such as a pilot light 150 and sounding an audible signal such as a bell 152, so long as the switch remains closed, it being very important that the rods be retracted as soon as the danger of jackknifing is past, and that the operator be acutely conscious of the fact that the rods are in active position so long as they remain in active position. A battery 154, which may be the conventional vehicle battery, has its negative terminal grounded. A positive battery terminal is connected to ground through the bell 152, the light 150, and the switch 148. The bell and battery could, of course, be connected in parallel relation instead of in series relation as shown.

A second branch of the pipe 144 is connected through a manually adjustable, constant pressure regulator 156 to the line 48 which communicates with the air bags 42. The operator is guided in setting the air bag pressure by a pressure gauge 158 which is connected to indicate the pressure in the line 48.

A third branch of the pipe 144 is connected through a manually adjustable, constant pressure regulator 160 to the line 122 which communicates with the air bags 118. The operator is guided in setting the air bag pressure by a pressure gauge 162 which is connected to indicate the pressure in the line 122. The operator is also guided in controlling the air pressure in the bags 142 and 118 by the reaction of the tractor to the various settings. The smoothest ride will generally result when the weight distribution on the several axles is near the optimum.

For simplicity and clarity the foregoing description has been substantially confined to the tractor-trailer combination illustratively shown. It is to be understood, however, that the invention is applicable to any combination in which a steerable lead vehicle pulls a following vehicle and bears a substantial part of the load of the following vehicle, while providing for relative angular motion of the two vehicles. The lead vehicle of such a combination is to be regarded as a tractor within the meaning of that term as used in the following claims, wherever permitted by the context.

I claim:

1. In a tractor having front and rear axles supported, respectively, by front and rear wheels equipped with pneumatic tires, through which tires the weight of the tractor and all loads imposed on the tractor are borne, and a frame whose rear end, at least, is normally free of any superstructure which would interfere with the bearing of the front end of a trailer thereon with freedom for relative turning of the tractor and trailer about a vertical axis, the combination with
 (a) the tractor frame, of
 (b) a fifth wheel,
 (c) means supporting the fifth wheel from the frame with capacity for rocking movement relative to the frame about a transverse axis,
 (d) said fifth wheel including a longitudinally slotted bearing plate for pivotally supporting the forward end of the trailer, and a combined reinforcement and extension of said plate comprising two rigid, parallel, spaced rails affixed, as unitary parts thereof, to the slotted plate at opposite sides of the slot, and extending forward beyond said plate, and far enough forward from said transverse axis of the fifth wheel to span a substantial and significant part of the distance between the front and rear axles of the tractor,
 (e) abutment means unitary with the forward ends of the rails, forming with the rails the forward end of the extended fifth wheel, and having lower abutment surfaces through which supplemental support for the forward end of the fifth wheel extension may be transmitted substantially vertically from the tractor frame,
 (f) a plurality of vertically acting, pneumatic, supporting cushions affixed to the frame beneath said abutment means, said cushions being of sufficient combined horizontal cross-sectional area to transmit pneumatically, under moderate pressure, a substantial and significant portion of the fifth wheel supported, trailer load, to the tractor frame, and (g) control means for adjusting the pneumatic pressure maintained in said cushions, and thereby varying over a wide range, the apportioning up to a significant part thereof, of the tractor-borne, trailer load between the rear wheels and the front wheels of the tractor.

2. In a tractor, the combination of claim 1 in which the reinforcing rails of the fifth wheel extend for a substantial distance to the rear of the transverse rocking axis of the fifth wheel for providing a rearward supporting structure, and in which rear cushioning means is provided between the frame and said rearward supporting structure, disposed to bear directly upward against the rear supporting structure.

3. In a tractor, the combination of claim 2 in which the front and rear cushions are pneumatic cushions, and separate means are provided, conveniently accessible to the driver, for adjusting and maintaining selected pneumatic pressures in the front and rear cushions, respectively, independently of one another, and for balancing the pressures of said front and rear cushions against one another, whereby the load distribution between the front and rear axles of the tractor may be adjusted, and the riding and steering qualities of the tractor may be improved.

4. In a tractor, the combination of claim 1 in which the fifth wheel slot is of uniform width through most of its length but has a flaring mouth at the rear end thereof, and in which the rails affixed to the plate and cooperative therewith form a slideway which extends for substantial distances to the front and rear of said transverse axis, (h) a longitudinally adjustable fifth wheel section disposed in said slideway and adjustable therealong, said section including (h1) a portion formed with a rearwardly opening slot which registers selectively with different segments of the upper bearing plate slot to receive and confine the kingpin of the trailer, (h2) a latching mechanism for securely fixing the kingpin in engagement with the forward end of the adjustable section slot, and (h3) means for fixing said adjustable section in selected, fixed positions with the kingpin either to the front of, to the rear of, or substantially over the transverse axis of the fifth wheel, the construction and arrangement being such that the division of load between the rear wheels of the tractor and the wheels of the trailer may be determined and controlled by the adjustment of said adjustable fifth wheel section.

5. In a tractor, the combination of claim 1 which further includes (h) a transverse framework carried on said rails, (i) means for securely anchoring the framework in any one of a multiplicity of selected positions longitudinally of the rails, (j) a pair of widely spaced massive rods supported and guided for vertical movement by the framework outside the lateral bounds of the rails and normally maintained in a retracted condition at a relatively low, inactive level in which they cannot obstruct or interfere with sidewise swinging of a trailer, (k) means constructed and arranged to be under the constant control of the driver for projecting the rods upward to active positions, in which they can restrict and limit sidewise swinging of the trailer and thereby forestall incipient jackknifing when, in the judgment of the operator, there is danger of jackknifing, but capable of being quickly rendered ineffective, and (l) means for quickly returning the rods to the inactive level when the rod projecting means is rendered ineffective.

6. In a tractor, the combination of claim 5 in which the rod projecting means consists of a pneumatic operator which includes expansible pressure chambers for acting upon the respective rods, and a manual control valve operable between a normal position in which it exhausts air from the pressure chambers and an active position in which it admits compressed air to the chambers.

7. In a tractor, the combination of claim 5 which further includes means automatically effective to give audible and visible signals for as long as the anti-jackknife rods are maintained in their active positions.

8. In a tractor, the combination of claim 1 in which the fifth wheel slot is closed at its forward end, is normally of a uniform width, sufficient snugly to receive the kingpin of a trailer, but has a flaring mouth at its rear end, said fifth wheel including a primary kingpin locking means normally effective to retain the kingpin positively in the forward end of the slot but operable to a kingpin releasing condition, and a supplemental, positive, kingpin retaining means carried by and cooperative with said rails and operable laterally of the fifth wheel between an ineffective position in which it leaves the slot clear, and an effective position in which it blocks the slot, thereby to limit movement of the kingpin along the slot and positively to prevent escape of the kingpin from the slot in the event of failure of the primary kingpin locking means.

9. In a tractor having front and rear axles which are supported, respectively, by front and rear wheels equipped with pneumatic tires through which tires the weight of the tractor and all loads imposed on the tractor are borne, and a frame whose rear end, at least, is free of any superstructure which would interfere with the bearing of the front end of a trailer thereon with freedom for relative turning of the tractor and trailer about a vertical axis, the combination with (a) the tractor frame, of (b) a fifth wheel of substantially greater length than breadth, and (c) means supporting the fifth wheel on the frame for rocking movement relative to the frame about a transverse axis, the fifth wheel including (b1) an upper bearing plate for sustaining the entire transmitted trailer load, said plate having a kingpin-receiving slot which is of uniform width throughout most of its length but has a flaring mouth at the rear end thereof, (b2) rigid reinforcing members affixed to the underside of said plate and cooperative therewith to form a slideway which extends for substantial distances to the front and rear of said transverse axis, (b3) a longitudinally adjustable fifth wheel section disposed in said slideway and adjustable therealong, said section including (b3a) a portion formed with a rearwardly opening slot which registers with different segments of the upper bearing plate slot to receive and confine the kingpin of the trailer, (b3b) a latching mechanism for securely fixing the kingpin in engagement with the forward end of the adjustable section slot, and (b3c) means for fixing said adjustable section in selected, fixed positions with the kingpin either to the front of, to the rear of, or substantially over the transverse axis of the fifth wheel, the construction and arrangement being such that the division of load between the rear wheels of the tractor and the wheels of the trailer may be determined and controlled by the adjustment of said adjustable fifth wheel section.

10. In a tractor having a frame whose rear end, at least, is free of any superstructure which would interfere with the bearing of the front end of a trailer thereon with freedom for relative turning of the tractor and trailer about a vertical axis, the combination with (a) the tractor frame of, (b) a fifth wheel including a rigid forward extension of substantial length, (c) means supporting the fifth wheel on the frame for rocking movement relative to the frame about a transverse axis, (d) a transverse framework carried on said extension, (e) means for securely anchoring the framework in any one of a multiplicity of selected positions longitudinally of the extension, (f) a pair of widely spaced massive rods supported and guided for vertical movement by the framework outside the lateral bounds of the extension, and normally maintained in a retracted condition at a relatively low inactive level in which they cannot obstruct or interfere with sidewise swinging of a trailer, (g) means constructed and arranged to be under the constant control of the driver for projecting the rods upward to active positions, in which they can, by engagement with the trailer, restrict and limit sidewise swinging of the trailer and thereby forestall incipient jackknifing when, in the judgment of the operator, there is danger of jackknifing, but capable of being quickly rendered ineffective, and (h) means for quickly returning the rods to the inactive level when the rod projecting means is rendered ineffective.

References Cited

UNITED STATES PATENTS

| | | | |
|---|---|---|---|
| 2,294,710 | 9/1942 | Berg et al. | 280—432 |
| 2,853,312 | 9/1958 | Fuschi | 280—432 |
| 2,468,705 | 4/1949 | Price | 280—432 |
| 2,736,573 | 2/1956 | Fuschi | 280—432 |
| 2,847,230 | 8/1958 | Hendrickson et al. | 280—406 |
| 2,996,312 | 8/1961 | Paul | 280—406 |
| 3,031,205 | 4/1962 | Fox | 280—432 |
| 3,092,399 | 6/1963 | Hair | 280—438 |
| 3,227,470 | 1/1966 | Funk | 280—405 |
| 3,363,914 | 1/1968 | Neel | 280—405 |

LEO FRIAGLIA, *Primary Examiner.*

U.S. Cl. X.R.

280—432, 440